United States Patent [19]
Nupuf

[11] 3,869,206
[45] Mar. 4, 1975

[54] OPHTHALMOMETER DEVICE

[76] Inventor: Joseph S. Nupuf, Canton, Ohio

[22] Filed: Oct. 22, 1971

[21] Appl. No.: 191,854

Related U.S. Application Data

[62] Division of Ser. No. 76,171, Sept. 28, 1970, Pat. No. 3,640,610.

[52] U.S. Cl. .................................... 356/2, 351/13
[51] Int. Cl. ............................................. A61b 3/00
[58] Field of Search ............... 356/2, 138, 170, 171; 351/13

[56] References Cited
UNITED STATES PATENTS

| | | | |
|---|---|---|---|
| 3,511,561 | 5/1970 | Gambs | 351/13 |
| 3,536,384 | 10/1970 | Cocks | 351/13 |
| 3,542,458 | 11/1970 | Volk | 351/13 X |
| 3,598,478 | 8/1971 | Townsley | 351/13 X |

Primary Examiner—William L. Sikes
Assistant Examiner—Paul K. Godwin
Attorney, Agent, or Firm—Teare, Teare & Sammon

[57] ABSTRACT

A device for determining the topography of an optic including a support member having a measuring unit mounted thereon. The measuring unit includes an optical system having a target assembly operably associated therewith and mounted in optical alignment with the optical axis of the optical system. Means included to maintain the optic in statonary, aligned relation with the optical axis. The target assembly includes a target member adapted to be illuminated by a source of light to produce an illuminated image on the reflective surface of the optic. The target member is mounted for selective telescopic movement along the optical axis of the optical system for increasing or decreasing the size of the image produced on the reflected surface of the optic to enable measurement of the curvature of relatively larger or smaller areas of the surface thereof.

6 Claims, 5 Drawing Figures

PATENTED MAR 4 1975 3,869,206
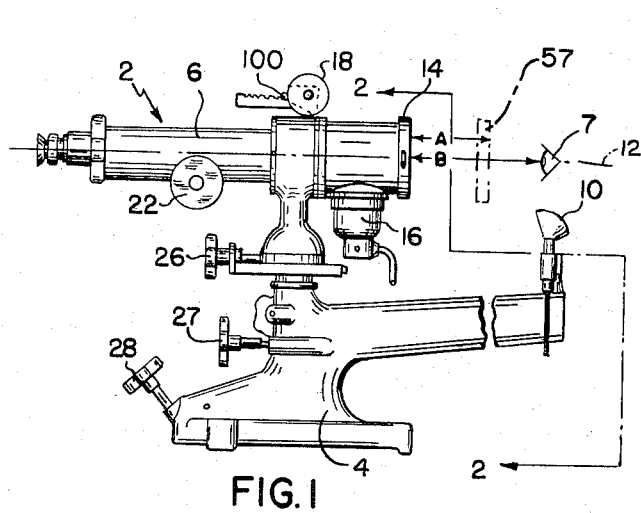
FIG.1
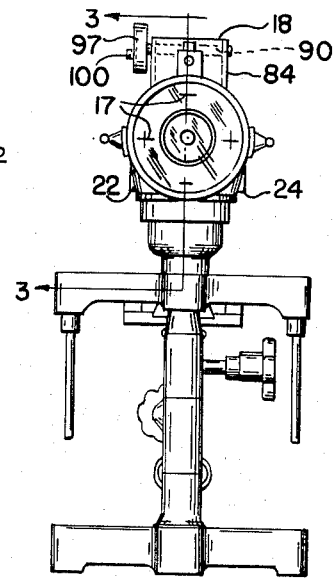
FIG.2
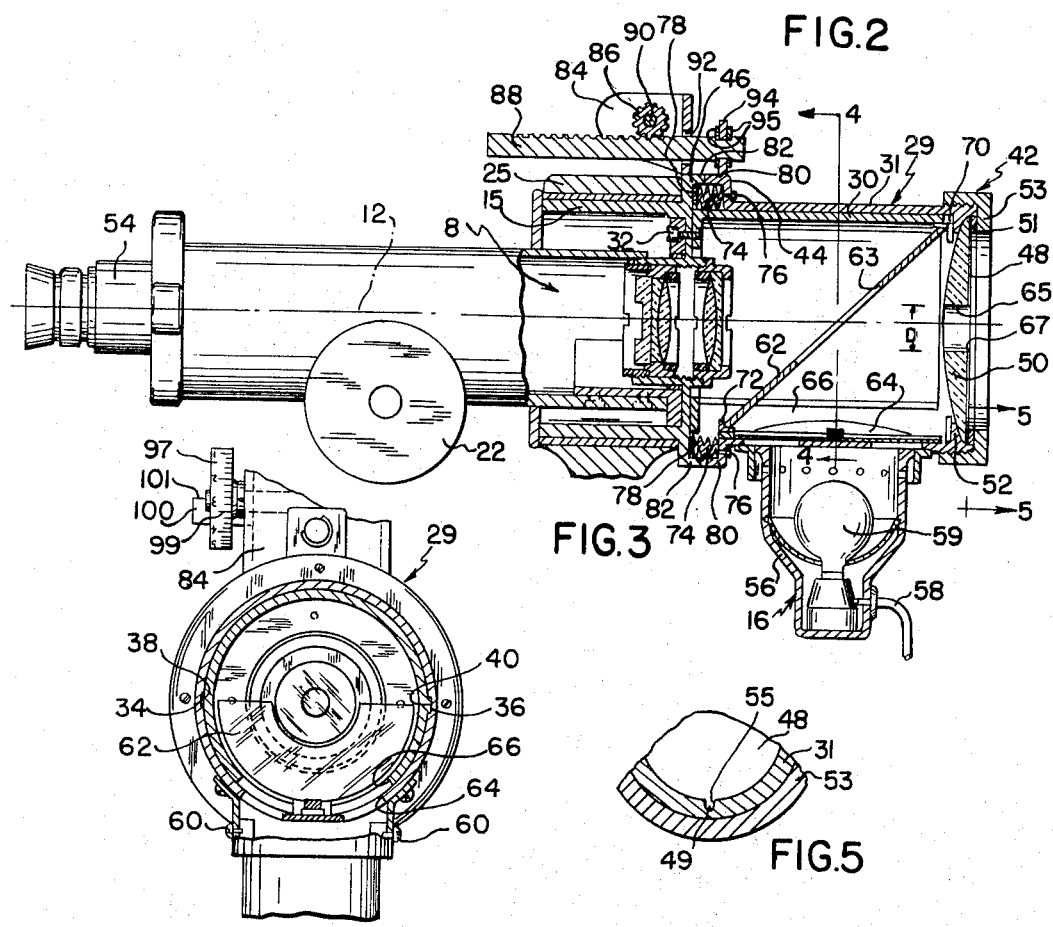
FIG.3
FIG.4
FIG.5

OPHTHALMOMETER DEVICE

This is a division, of application Ser. No. 76,171, filed Sept. 28, 1970 now U.S. Pat. No. 3,640,610.

BACKGROUND OF THE INVENTION

This invention relates to an ophthalmic device and method for determining the optical characteristics of an optic, such as the cornea of an eye, a contact lense or the like, and more particularly relates to a measuring device and method for measuring the curvature of the entire optical surface of an optic.

As the exposed surface of the cornea of the average eye does not have a constant curvature from its apex to its limbus, it is advantageous to ascertain the variations of such curvature in order to design well fitting contact lenses. Depending upon the individual eye, the cornea, absent astigmatism, is essentially spherically curved within an area of 3 to 4 millimeters which area is known as the optical cap, and then, gradually flattens over the extent of the remainder of its curvature to its limbus.

In the ophthalmometers, sometimes referred to as keratometers, used in ophthalmic practice, such as described in U.S. Pat. No. 1,750,931, issued Mar. 18, 1930, to Gustav A. H. Kellner et al., a target is provided which produces an illuminated object adapted to be reflected by the exposed surface of the cornea of the patient's eye. In such instruments, there is provided a reflective surface on which the patient focuses the eye to be examined, and the reflected image which is seen thereon serves as a fixation target to maintain the patient's eye in a stationary and accurate fixation position throughout the examination. The aforementioned illuminated target provides specifically configured light beams which strike the cornea of the eye at spaced points on the respective primary meridians, such as approximately 2½ millimeters apart. These lighted images produced on the surface of the cornea of the patient's eye are viewed by the operator through a telescopic optical system so arranged as to derive from the light beams reflected from the cornea, a fixed reference image and two adjustable images. With the ophthalmometer in proper adjustment a zone of approximately 2½ millimeters, defined by the spacing of these images, is measured. This zone, known as the visual apex, is the portion of the eye actually used in vision. The telescopic optical system is provided with an independent calibrated adjusting means for adjusting the position of each adjustable image relative to the reference image in order that each adjustable image can be brought into optical alignment in a predetermined manner with the reference image. In this manner, the chordal distance between where the respective pair of light beams strike the cornea can be measured.

These former instruments have been useful in determining the corneal curvature surrounding the apical zone of the cornea, but have been limited to the measurement of a single fixed zone of predetermined dimension, such as 2½ millimeters. It has been found extremely desirable to be capable of measuring a plurality of zones both within and surrounding the apical zone, such as in the range of 1 to 6 millimeters. More particularly, it has been found desirable to measure such zones in infinitessimal incremental steps to give a more exact and complete description of the optical surface of the cornea to determine whether the cornea is developing any abnormalities, such as the pathological condition of kerataconus or irregular cornea. More recently, the need for such a device has increased substantially to improve the quality of workmanship and fitting techniques in the application of contact lenses. As the inside of a contact lense must approximately match the curvature of the cornea to provide a proper fit and allow for normal interchange of tear flow, it is essential that numerous zones of curvatures of the cornea be measured to enable an accurate measurement over its entire surface. In addition, such accurate measurements would be extremely beneficial in order to verify that contact lenses have been accurately fabricated by the manufacturer to the design ordered by the eye specialist and to ensure that there are no defects, abberations or distortions of the lenses which could result in damage or impairment to the eye of the intended user.

SUMMARY OF THE INVENTION

The present invention comtemplates providing an improved ophthalmic device including an optical system for measuring the topography of an optic, such as the cornea of an eye, a contact lense or the like. More specifically, the device comprises a support member adapted for supporting the optic in accurate alignment with the optical axis of the optical system. A target means is adjustably mounted on the support member for selective movement along the optical axis relative to the optic being adapted to produce a variable size image thereon upon movement relative thereto. A measuring unit is operably associated with the optical system and the target means for determining the topography of the optical surface of the optic over an area varying in relation to the size of the image produced thereon.

The target means comprises an extensible target assembly mounted for telescoping movement along the optical axis including a selectively adjustable means operably connected with the support member for moving the target assembly relative to the optic. The target assembly includes mire means mounted in predetermined relation with respect to the optical axis and moveable with respect to the optic being adapted to project an image onto the optical surface of the optic. The target assembly is moveable independently of the optical system obviating the necessity of refocusing the reflected image after each adjustment of the target means relative to the optic. The target assembly include a light source adapted to illuminate the mire means, and which is moveable, as a unit, with the mire means to maintain the intensity of illumination substantially constant. The target assembly includes a target member having a plurality of mire elements disposed in predetermined spaced relation thereon being adapted to produce a mirror image thereof on the optical surface of the optic, and the target member is moveable along the optical axis to move the mire elements toward and away from the optic to increase or decrease, respectively, the size of the reflected image of the mire elements on the optical surface. In addition, the target member may comprise a plurality of interchangeable target plates adapted for use one at a time during the operation of the device, and which target plate includes mire elements disposed in predetermined spaced relation thereon with the spacing between the respective mire elements on one of the target plates varying from the spacing of the mire elements on the other of the target plates so that the image produced varies in size for a given setting of the device upon interchanging of one target plate with any other of the target plates.

BRIEF DESCRIPTION OF THE DRAWINGS

FIG. 1 is a side elevation view of the measuring device of the present invention;

FIG. 2 is an enlarged, front elevation view of the device illustrated in FIG. 1 taken along the line 2—2;

FIG. 3 is an enlarged longitudinal section view taken the lines 3—3 of FIG. 2; and FIG. 4 is a fragmentary, partial transverse sectional view of the device illustrated in FIG. 3 taken along the line 4—4.

DESCRIPTION OF THE PREFERRED EMBODIMENTS

There is illustrated in FIG. 1, generally at 2, a measuring instrument, such as an ophthalmometer or the like, used for measuring the topography of an optic 7, such as the cornea of an eye or the like. As shown, the measuring instrument includes a support pedestal 4 on which is mounted a measuring unit 6. The measuring unit 6 includes a telescopic optical system, illustrated generally at 8 in FIG. 3, for viewing the eye 7 of a patient, and being of the general type well known in the art and described more fully in U.S. Pat. No. 1,750,931 issued to G. A. H. Kellner, et al. The support pedestal may include a chin rest 10 which is adapted to support the patient's head in a manner so as to align the visual axis of the cornea with the optical axis, such as 12 (FIG. 3) of the optical system. An adjustable target means 14 is supported adjacent the forward end of the measuring unit in aligned relation to the optical axis of the optical system, and preferably includes specifically configured mire elements, such as at 17 (FIG. 2) which are adapted to be illuminated by a light source, as at 16, in a manner well known in the art. Conventionally, these illuminated images are projected in spaced relation on the reflecting surface of the cornea 3 of the patient's eye. An actuating mechanism is operably associated with the target means 14 for selectively adjusting the distance between the mire elements 17 and the cornea 7 for varying the size and/or spacing of the images reflected thereon, and which images are viewed through the telescopic optical system by the operator. After each selective adjustment of the target means 14, calibrated knobs 22 and 24 of the optical system may be actuated to bring the images reflected on the surface of the cornea into aligned relation with one another whereby the radius of curvature of the optical surface of the cornea may be determined in the manner as previously described.

As shown in FIG. 3, the measuring instrument 2 includes a cylindrical support sleeve 15 which is journaled for rotation within a collar 25. The collar 25 is movably mounted adjacent the upper end of the support pedestal 4 being adjustable, such as by means of the adjustment knob 26 (FIG. 1) to enable relative movement of the measuring unit 6 toward or away from the eye of the patient being examined. Similarly, adjustment knobs 27 and 28 may be provided to enable adjustment of the chin rest 10 and support pedestal 4, respectively, to accurately and properly align the cornea 7 with the optical axis of the optical system. Conventionally, the device includes a fixation target (not shown) on which the patient may fix his sight to accurately and properly align the visual axis of the cornea 3 in substantially coincident relation with the optical axis of the telescopic system.

As shown, the target means 14 comprises an extensible housing 29 of any suitable configuration, but is shown as being generally cylindrical in transverse cross section (FIG. 4) and includes an inner sleeve 30 and a moveable outer sleeve 31 mounted in telescoping relation on the inner sleeve 30.

The inner sleeve 30 may be physically connected in generally axial alignment to the support sleeve 15 in any suitable manner, such as by screws or the like, as at 32, having a central axis thereof coincident with the optical axis 12 of the optical system 8. In the form shown, the outer sleeve 31 is disposed in generally concentric relation with respect to the inner sleeve 30 being adapted for sliding movement with respect thereto. In the form shown, the inner sleeve 30 is provided with tongues 34 and 36 which are adapted to be disposed in sliding relation within grooves 38 and 40 provided adjacent the interior surface of the outer sleeve 31 to secure the latter in relatively fixed angular relation with respect to the inner sleeve 30.

As shown, a target assembly 42 is mounted adjacent the front end of the outer sleeve. The opposite or rear end of the outer sleeve is provided with an annular flange 44 which is adapted for abutting engagement with a similarly configured oppositely disposed annular flannge 46 which may be formed as part of the support sleeve 15, and which provides a stop for limiting rearward movement of the outer sleeve with respect to the inner sleeve. The target assembly 42 preferably includes a target plate 48 which is positioned adjacent the forward surface of a light condensing lense 50.

As shown, the lense 50 may be held in place on one side, such as the rearward side, by an annular flange 52 which projects inwardly from the interior surface of the outer sleeve and on its opposite or front side by a ring-like cap member 53. The cap member may be detachably mounted on the forward end of the outer sleeve, such as by threading or the like. A deformable washer member 51 may be provided being adapted to engage the target plate adjacent the marginal edge thereof. By this arrangement, the cap member 53, when in the mounted position, will force the washer member against the target plate 48, and thus, firmly hold the latter against the front side of the lense 50. As shown in FIG. 5, the target plate 48 may include a tab 49 extending radially outwardly therefrom being adapted for registration with a notch 55 in the outer sleeve 31 to precisely position the mire elements 17 in the proper horizontal and vertical orientation with respect to the optical system.

The target plate 48 is conventionally made of an opaque material which is provided with spaced, translucent areas defining the mire elements 17 which have a specific configuration and orientation with respect to one another, and which, in turn, provide an illuminated object to be reflected on the surface of the patient's cornea. In the invention, it is contemplated that the target plate 48 be removeable so that other target plates having larger or smaller spacing between the mire elements may be utilized to provide a wide range of measurement. For example, one target plate, such as 48, may be used to enable measurements to be made covering concentric circular zones or areas having transverse dimensions ranging from approximately 1 to 6 millimeters when the target plate is moved, such as a distance A, from the fully retracted position to the fully extended position of the housing, as at 57 (FIG. 1). Whereas, the target plate 48 may be replaced by another target plate (not shown) including mire elements thereon having a different size and/or spacing defining zones having transverse dimensions greater than those defined by the target plate 48. As the reflected image on a surface of the cornea of the patient's eye is maintained in a substantially fixed position with respect to the telescopic portion of the optical system, it is not necessary to refocus, such as by means of the eye piece 54, on the reflected image for every change of position of the target plate and/or change of the target plate itself.

The light source 16 preferably includes a support receptacle 56 which is detachably mounted on the outer sleeve 31 being moveable therewith, as a unit, upon movement of the outer sleeve with respect to the inner sleeve. The receptacle 56 may be connected to a suitable source of electrical energy, such as by the conductor 58, to provide power for illuminating an electrical light bulb 59. The receptacle 56 may be attached to the outer sleeve in any suitable manner, such as by screws 60 or the like (FIG. 4) which will enable the receptacle 56 to be easily and readily dismantled from the outer sleeve to replace the bulb 59, as desired.

To direct the light rays toward the target plate 48 and illuminate the mire element 17, a light deflecting member 62, such as a mirror, is provided which may be disposed at an angle, such as 45°, with respect to the optical axis of the optical system. In this manner, the light eminating from the light source 16 will be deflected toward the condensing lense 50, and thus, illuminate the mire elements. As shown, the mirror 62 is provided with an opening 63 disposed in generally axial alignment with generally circular openings 65 and 67 in the lense 50 and target plate 48, respectively, to enable the operator to view the reflected images on the cornea of the patient's eye and to enable the patient to view the fixation target (not shown) which is mounted in a manner so as to align the visual axis of the cornea in substantially coincident relation with the optical axis of the telescopic system. The openings 63, 65 and 67 should have a minimum transverse dimension when measured along any line perpendicular to the optical axis, such as the dimension D (FIG. 3), sufficiently large, such as 20 millimeters or greater so that the reflected images on the cornea can be clearly and easily seen. Preferably, the outer sleeve 31 is provided with a generally circular opening 64 through which the light from the light source 16 passes. The inner sleeve 30 is provided with an elongated slot 66 which may extend for substantially the full length thereof to enable the light rays to pass into the interior of the inner sleeve 30.

The mirror 62 is initially disposed within the interior of the inner sleeve 31 being supported by the outer sleeve 31. As shown, the mirror 62 is supported at its forward raised end by a generally L-shaped support element 70 which may be secured to the flange 52, such as by welding or the like. Similarly, the rearward end of the mirror 62 may be supported by another support element 72 which may be suitably secured to the outer sleeve, such as by welding or the like. By the aforementioned arrangement, the mirror 62 and light source 16 will move, as a unit, with the outer sleeve 31 so that the intensity of the illumination of the mire elements will remain substantially constant regardless of the distance moved by the outer sleeve.

A bellows-like sealing member 74 may be provided to prevent the escape of light through the slot 66 upon extension of the housing 29. The sealing member 74 may be attached at one end to the rearward end of the outer sleeve 31, such as by rivets 76, and detachably connected at the other end to the support sleeve 15, such as by a snap ring 78 or the like. Preferably, the flanges 44 and 46 include generally horizontally extending outer rims 80 and 82, respectively, which extend in a direction toward one another to define an enclosure for the sealing member.

The actuating mechanism 18 may comprise a rack and pinion type structure including a support bracket 84 which is physically fixed to the inner sleeve 15. More specifically, a gear element 86 may be provided having teeth thereon disposed for engagement with teeth provided in a rod 88. As shown, the gear 86 may be mounted on a shaft 90 which is journalled for rotation in the support bracket 84. Further, the rod 88 may be mounted in sliding relation at one end within an opening 92 provided in the support bracket 84 and at its opposite end by a generally upright arm 94 which projects upwardly from the flange 44 whereby upon actuation of the rod 88, the outer sleeve will be moved with respect to the inner sleeve. The rod 88 may be connected to the arm 94 in any suitable manner, such as by snap rings 95 or the like. A suitable control knob 97 may be provided adjacent one end of the shaft 92 to impart selective movement to the rod 88, and thus, the outer sleeve 31. Preferably, the control knob 97 is provided with indicia elements, such as 99 (FIG. 4), which may be calibrated to indicate the distance B, such as in millimeters, of the target plate from the surface of the cornea. By this arrangement, the operator will have sufficient information to readily calculate the radius of curvature of the particular zone being measured in a manner well known in the art. As these calculations may be time consuming, common charts may be provided which are precalculated to aid the operator. As these charts are not necessary to an understanding of the device, they will not be described herein. Referring again to FIG. 4, a reference member 100 may be provided for reading the setting of the control knob 97. More specifically, the reference member 100 may be suitably attached to the support bracket 84 so as to extend outwardly therefrom having the upper edge 101 aligned with the indicia element which indicates the distance of the target plate from the surface of the cornea. Therefore, the operator may pre-set the control knob 97 for a given size image or may make a series of setting which will provide measurements covering a wide range of generally concentric areas.

OPERATION

In a typical operation of the device, the chin of the patient is placed in the chin holder 10 and the operator adjusts the position of the chin holder so as to position the cornea of the patient's eye in optical alignment with the optical axis of the optical system 8. The patient then views the fixation target so as to align the visual axis of the cornea in substantially coincident relation with the optical axis, and thus, maintain the cornea in a substantially fixed position to perform the measuring operation. The operator may then adjust the knob 26 to position the target plate 48 with respect to the patient's cornea to obtain, for example, the smallest desired zone size, such as approximately 1 millimeter. The operator may then focus the image and make a reading to determine the radius of curvature of the zone or area being viewed. As the size of the reflected image will increase as the target plate 48 is moved toward the cornea, the knob 97 may then be rotated, to move the target plate independently of the optical system in telescoping relation toward the patient's cornea to obtain the next desired zone size, for example 2 millimeters. After making a reading in this position, the operator may continue to take readings at positions closer to the patient's cornea until the maximum desired zone size is reached. It is understood, that the operator may begin taking readings at the maximum desired zone size and gradually withdraw the target plate away from the patient's cornea to take readings at selected positions until the smallest desired zone size is obtained. As the movement of the target plate is independent of the optical system, the reflected image remains in focus throughout the entire measuring process, and thus, this obviates the necessity of adjusting the telescope for every movement of the target plate.

I claim:

1. A method of determining the topography of an optic to be employed with an opthalmometer instrument of the type which includes a target assembly having mire elements defining a target image for producing a reflected image on the surface of an optic so as to define a zone thereon, said instrument including means capable of selectively varying the position of said mire elements in infinitesimal, incremental steps within a given range between a small image and a large image, and a telescopic optical system having a telescope for viewing the reflected image on the surface of the optic and a calibrated measuring lens system capable of making a direct measurement of the zone defined by the reflected image on the surface of the optic, said method comprising the steps of:

supporting the optic at a position along the optical axis of the telescopic system so that the reflected image produced by the mire elements thereon can be viewed, selectively positioning the mire elements with respect to the optical axis of said instrument so that they produce a reflected image of any one preselected size within said range for defining one zone on the surface of said optic, taking a direct measurement of the radius of curvature of said one zone defined by said reflected image of said one predetermined size on the surface of said optice by said instrument, selectively repositioning said mire elements with respect to said optical axis to produce a target image of any size within said range in any size incremental step to produce at least one other reflected image of a different size than said one reflected image for defining at least one other zone on the optical surface of said optic, and taking a direct measurement by the instrument after each time the position of the mire elements is changed for directly measuring the radius of curvature for each of the zones defined thereon to obtain as complete a determination of the curvature of as much of the entire optical surface of the optic as desired.

2. A method in accordance with claim 1, including changing the position of the mire elements so that the reflected image defining said one zone is smaller than the reflected image defining said other zone.

3. A method in accordance with claim 1, including changing the position of the mire elements so that the reflected image defining said one zone is larger than the reflected image defining said other zone.

4. A method in accordance with claim 2, including changing the position of said mire elements by moving said mire elements toward said optical surface.

5. A method in accordance with claim 3 including changing the position of said mire elements by moving said mire elements away from the surface of said optic.

6. A method in accordance with claim 1, including maintaining said optic in substantially stationary relation with respect to the telescopic optical system while changing the position of said mire elements to obviate the necessity for focusing said telescopic optical system after changing the position of said mire elements.

* * * * *